July 27, 1926.
C. E. BOBBITT
BATTERY CABINET
Filed July 25, 1924
1,594,090
Fig. 1.
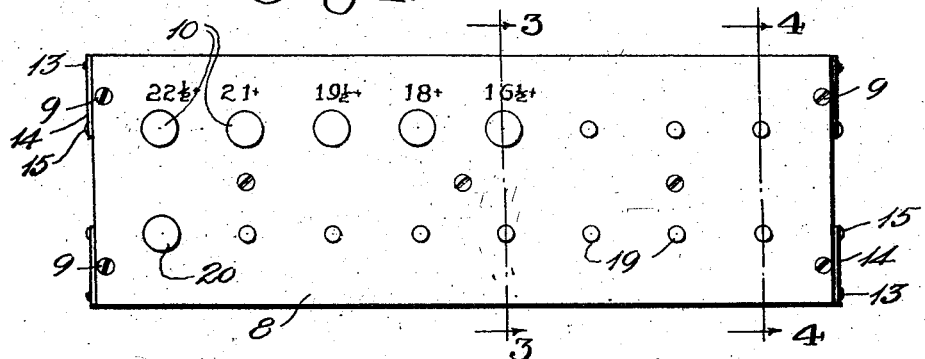
Fig. 2.
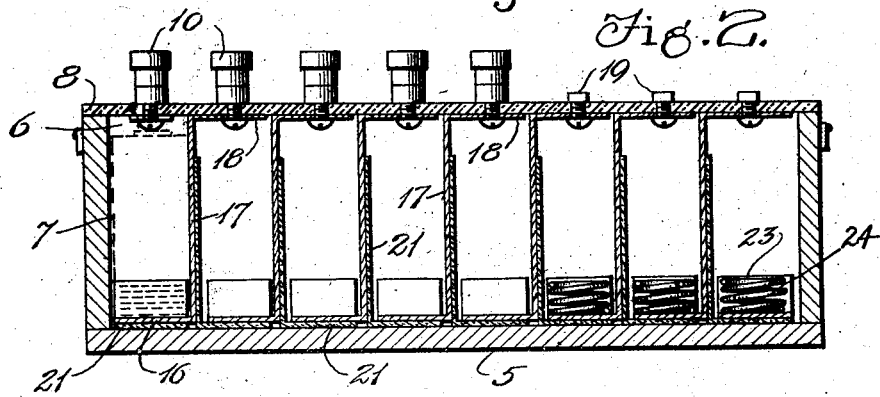
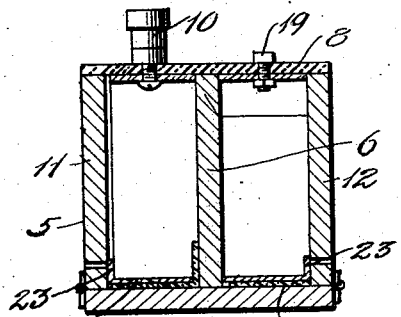
Fig. 3.    Fig. 4.
Inventor
Conrad E. Bobbitt,
By Harold Appleman,
Attorney.

Patented July 27, 1926.

1,594,090

UNITED STATES PATENT OFFICE.

CONRAD E. BOBBITT, OF HUMBOLDT, TENNESSEE, ASSIGNOR OF ONE-EIGHTH TO WILLIAM NOBLE THWEATT AND ONE-HALF TO LLOYD SENTER ADAMS, BOTH OF GIBSON COUNTY, TENNESSEE.

BATTERY CABINET.

Application filed July 25, 1924. Serial No. 728,226.

This invention relates to battery cases or cabinets, and particularly to a cabinet intended to hold a plurality of dry cells to form a "B" battery for a radio set.

It is an object of this invention to produce a cabinet having a plurality of compartments adapted each to contain a dry cell or battery, the said cabinet having novel means for electrically connecting the batteries in series; the said case having novel means for maintaining the contacts whereby the terminals of the batteries will be connected to insure the passage of current to the terminals.

It is a further object of this invention to provide a cabinet of the character indicated having a plurality of terminals by which current may be delivered and the voltage thereof controlled within predetermined bounds, and in the present embodiment, the voltage is stepped from 16½ to 22½ volts.

It is a still further object of this invention to produce a battery cabinet having means which will permit batteries to be tested in order that any dead cell may be discovered and renewed, and it is furthermore an object to produce a cabinet which will permit the installation or removal of the cells expeditiously and conveniently.

With the foregoing and other objects in view, the invention consists in the details of construction, and in the arrangement and combination of parts to be hereinafter more fully set forth and claimed.

In describing the invention in detail, reference will be had to the accompanying drawings forming part of this application wherein like characters denote corresponding parts in the several views, and in which—

Figure 1 illustrates a plan view of a battery case cabinet embodying the invention;

Figure 2 illustrates a longitudinal sectional view thereof;

Figure 3 illustrates a sectional view on the line 3—3 of Fig. 1; and,

Figure 4 illustrates a sectional view on the line 4—4 of Fig. 1.

In these drawings, 5 denotes a casing having bottom, side and end walls, the said casing preferably being of rectangular configuration. A central longitudinal partition 6 divides the casing into what might be termed two compartments, each of which is intended to contain a plurality of batteries or cells 7.

A covering 8 of hard rubber or some other nonconductor is applied to the casing and secured thereto by fastenings 9 such as screws, and the said cover is provided with a plurality of terminal posts 10, each of which is electrically connected to a battery and through the terminals of the battery the said batteries are connected in series, as will presently appear. The sides 11 and 12 of the casing are hinged at their bottoms so that they swing outwardly to permit the insertion or removal of the cells. Each side has a stud 13 at each end, and each stud is engaged by a hook or latch 14 that is pivotally mounted on a stud 15 at the end of the casing, so that by disengaging the hooks from the studs, the sides may be swung outwardly.

The interior of the casing is provided with a plurality of partitions forming compartments, each of which partitions comprises a base or bottom plate 16, a vertically disposed wall 17 and an angularly disposed extension 18 which is secured to the cover by a binding post or terminal. The positive and negative connections of the cells of the battery are thus made by the sheets of metal having the angularly disposed ends, as stated. As has been stated, a plurality of binding posts is employed for certain of the cells, whereas terminals such as 19 are employed as associated with other angularly disposed portions 18. The terminals 19 or the binding posts may be used for the purpose of testing the different cells, by the application to the terminals of testing instruments, as one skilled in the art will understand.

When cells have been installed in all of the spaces of the cabinet and the terminals of the cells are in engagement with the terminals or binding posts and the base plates, the cells will be arranged in series in order that current therefrom may be employed and taken off from any of the binding posts, according to the voltage desired.

In Fig. 1, the binding posts are provided with indicia, showing that current at 16½, 18, 19½, 21 and 22½ volts respectively, may be taken from the battery, according to the terminal post to which the conductor is connected. The negative terminal or binding post is identified by the numeral 20 so that when the conductors are connected to the said negative post and to any one of the positive terminal posts, circuit will be established through the battery.

The base plates 16 are held in spaced relation to the bottom of the cabinet by insulating strips 21 and these insulating strips also extend upwardly along the surface of the vertically disposed portion 17 of the conductors in order to insulate the cell which bears against the strips.

It will be seen from an inspection of the drawing that the partition 6 and the conducting elements comprising the base 16, the vertically disposed portion 17 and the angularly disposed portion 18 when assembled in the casing produce what might be regarded as a series of compartments in each of which a cell may be deposited. The heads of the terminal contacts or binding posts bear against one terminal of the battery, whereas the other terminal rests on one of the base plates, and therefore, as stated, the cells will be electrically connected.

At one end of the battery casing the angularly disposed portion 22 of the conductor extends across the partition into a compartment on the other side thereof and it is connected to the contact post in that compartment, the circuit being established through the cell in that compartment between the base plate and the terminal contact.

Each base plate is shaped to form a flange 23 which rises at the front of the compartment for the reception of the cell, and each of said flanges serves to hold a cell in place and guard against its accidental dislodgment from the cabinet.

A coil spring 24 is located in the bottom of each compartment and it is adapted to engage the bottom of the cell for forcing the terminal of the battery into contact with its terminal post. The sides of the battery case have apertures such as 25 through which one of the terminals of a volt meter may be inserted to engage the flange 23 when the other terminal of the volt meter is applied to the respective terminal post, a condition which will enable an operator to read the charge of the individual battery in the compartment.

In utilizing this invention it will be apparent that the compartments could be made of such height as to accommodate one or more unit cells, a condition which would result in increasing the voltage, as is well known.

I claim:

1. A battery cabinet or receptacle comprising a casing having a longitudinal partition, a cover of insulated material, a bottom attached to the partition, sides hinged to the bottom and adapted to swing outward, a plurality of conductors each comprising a member having an upstanding portion, one end being angularly disposed and apertured for engagement with binding posts carried by the insulated cover, the opposite end portion of the conductor being bent at an opposite angle from its upper portion and again bent to provide side extending portions.

2. A battery cabinet or receptacle comprising a base and ends, sides hinged to the base, a longitudinal partition attached to the base, a cover carried by the end pieces, said cover being of insulating material and provided with two rows of binding posts, conductors attached to the binding posts, said conductors being provided with a vertical portion and insulating material maintained in place to be positioned between a cell and a conductor.

3. In a battery cabinet, a frame comprising a longitudinal partition, a base to which the partition is attached, a cover of insulating material, ends to which the cover is attached, and sides hinged to the base, means for forming longitudinal compartments comprising conductors having an intermediate portion, ends which are oppositely bent to extend at right angles from said upstanding portion, one of the end portions having apertures for the passage of means for attaching said conductors to the insulated cover, the opposite end of the conductors having parallel upstanding portions between which the base of a cell will be located, and means opposite the upstanding portion and the lower part of the conductors for insulating the body portion of the cell from the vertical portion of the conductors which are attached to the insulated top.

4. A casing for batteries comprising a bottom member, a longitudinal partition attached to said bottom member, a cover of insulating material removably attached to the ends of the casing, side members hinged to the bottom of the casing and provided adjacent to said bottom with testing apertures, a conductor connected electrically with the insulated cover and provided with vertical portions forming cell chambers, said chambers being insulated from the adjacent chambers, substantially as shown.

CONRAD E. BOBBITT.